(No Model.)
C. J. LAW.
HARNESS.
No. 540,261.                    Patented June 4, 1895.
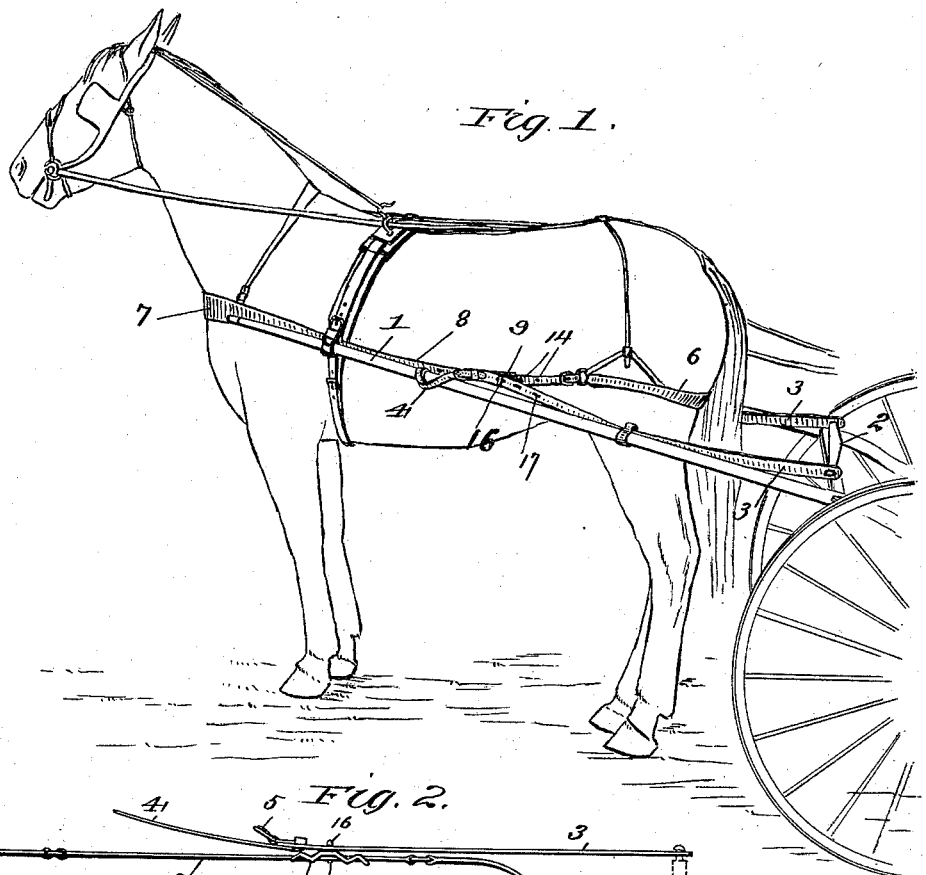
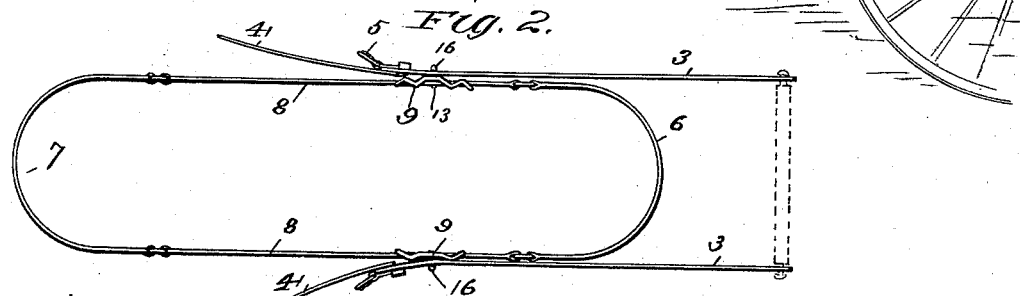
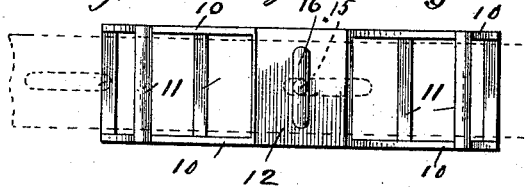
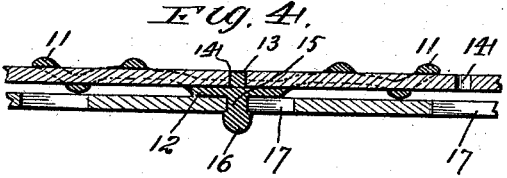
WITNESSES
INVENTOR
Charles J. Law
By Alexander & Davis
Attorneys

UNITED STATES PATENT OFFICE.

CHARLES J. LAW, OF MERCER, PENNSYLVANIA.

HARNESS.

SPECIFICATION forming part of Letters Patent No. 540,261, dated June 4, 1895.

Application filed April 1, 1895. Serial No. 544,050. (No model.)

*To all whom it may concern:*

Be it known that I, CHARLES J. LAW, a citizen of the United States, residing at Mercer, in the county of Mercer and State of Pennsylvania, have invented certain new and useful Improvements in Harnesses, of which the following is a specification, reference being had therein to the accompanying drawings, in which—

Figure 1 is a view showing the device in operative position. Fig. 2 is a plan of a portion of a harness, showing the improvement. Fig. 3 is a side elevation of the coupling device, and Fig. 4 is a horizontal sectional view thereof.

This invention relates to new and useful improvements in harness, and it has for its object to provide means for attaching draft animals to vehicles, which will obviate the necessity of securing the tugs or traces to the singletree and the holding-back straps to the shafts every time the animal is attached to the vehicle, thereby enabling the "hitching up" to be done very quickly and easily.

The invention consists in certain novel combinations and arrangements of parts hereinafter described, and particularly set forth in the claims appended.

Referring to the various parts by numerals, 1, designates the usual shafts of a vehicle, 2 the whiffletree, and 3 the traces which are connected at their rear ends to the whiffletree in any suitable manner. These traces are made shorter than the ordinary traces and extend to about the point where the holding-back straps are usually secured to the shafts, and are each provided at its forward end with a flexible strap 4 and a buckle 5. These flexible straps are wound around the shafts, and their ends are secured by the buckles 5 carried by the traces, as shown in Fig. 1, and act as holding-back straps as will presently appear. The traces remain secured to the singletree and shafts, and are not attached or detached during the operation of hitching or unhitching the horse.

Connecting the two ends of the breech-band 6 with the ends of the breast-strap 7, (or with the hames, if a collar-harness is in use,) are a pair of strong side-straps 8, 8. These straps are connected to the rings of the breech-band by buckles or other suitable connections, and are connected in any suitable manner to the ends of the breast-strap. Adjustably secured on each of these straps is a metal coupling or connecting device 9, each of which consists of a long frame formed of the two side pieces 10, 10, between which the attached side-strap passes, said side pieces being connected by cross-bars 11, each alternate one of which is connected to opposite edges of the side pieces and extend on opposite sides of the strap 8, as shown in Fig. 4.

The side pieces 10 are connected on their outer edges midway between their ends by a broad plate 12 which is formed with an inwardly projecting stud 13, which stud is adapted to enter one of a series of holes 14 formed in the adjacent side-strap 8, to securely hold the device on said strap. A series of these holes is formed in each side strap in order that the attached coupling device may be adjusted along said strap.

Projecting outwardly from the center of the plate 12 is a short stud 15 on the outer end of which is formed a cross-bar or elongated button 16, which button extends transversely of the frame 9, as shown. This button is adapted to pass through one of a series of slots 17 formed in each of the traces, said slots being formed longitudinally of the traces, as shown. To couple the traces to the straps 8, it is necessary to turn them at right-angles to their normal position in order to pass the button 16 through the slots 17 therein. When the traces are returned to their normal position after they are coupled to the straps 8, the button 16 stands at right-angles to the slots 17, and accidental disconnection of these parts is almost impossible.

It will thus be seen that I produce an exceedingly simple device by means of which a horse or other draft animal can be quickly and readily attached and detached from a vehicle, and whereby the necessity of attaching and detaching the traces and holding-back straps every time the animal is hitched to the vehicle is avoided.

It will be seen that that portion of the traces forward of the buttons 16, and the flexible straps 4 act together as holding-back straps, and that portion of the traces from the buttons back to the whiffletree acts in the usual way and receives the pulling strain.

By means of the series of holes 14 and the series of slots 17 the coupling may be adjusted to suit horses of various sizes, as is manifest.

Having thus fully described my invention, what I claim is—

1. In a harness the combination of a pair of shafts, a singletree, a pair of traces secured at one of their ends to the singletree and at their other ends to the shafts, a harness, and means for detachably connecting the harness to the traces between the points of attachment to the whiffletree and the shafts, substantially as described.

2. In a harness the combination of a pair of shafts, a singletree, a pair of traces connected at their rear ends to the singletree, flexible straps connected to their forward ends and adapted to be connected to the shafts, a harness, and means for detachably connecting the harness to the traces, substantially as described.

3. In a harness the combination of a pair of shafts, a singletree, a pair of traces connected at their rear ends to the singletree and at their front ends to the shafts, a breech-band and a breast-strap, a pair of side-straps connecting the ends of these straps, and a coupling-device carried by each side-strap for detachably connecting them to the traces, substantially as described.

4. In a harness the combination of a pair of shafts, a singletree, a pair of traces connected at their rear ends to the singletree and at their front ends to the shafts, a breech-band and a breast-strap, a pair of side-straps connecting the ends of these straps, and a coupling-device carried by each side-strap for detachably connecting them to the traces, said device consisting of a frame adapted to be secured to the side straps and formed with the button 16 adapted to enter slots in the traces, substantially as described.

5. In a harness the combination of a pair of shafts, a singletree, a pair of traces connected at their rear ends to the singletree and at their front ends to the shafts, a breech-band and a breast-strap, a pair of side-straps connecting the ends of these straps, and a coupling-device carried by each side-strap for detachably connecting them to the traces, said device consisting of a frame adapted to be secured to the side straps, and formed with the button 16 adapted to enter slots in the traces, and with an inwardly extending stud 13 adapted to enter one of a series of holes formed in the side straps, whereby said device is adjustably secured thereto, substantially as described.

In testimony whereof I affix my signature in presence of two witnesses.

CHARLES J. LAW.

Witnesses:
T. A. BLACK,
J. P. WILLIAMSON.